T. H. MOONEY.
METALLIC TRAIN PIPE CONNECTION.
APPLICATION FILED MAY 12, 1917.
1,250,336.
Patented Dec. 18, 1917.
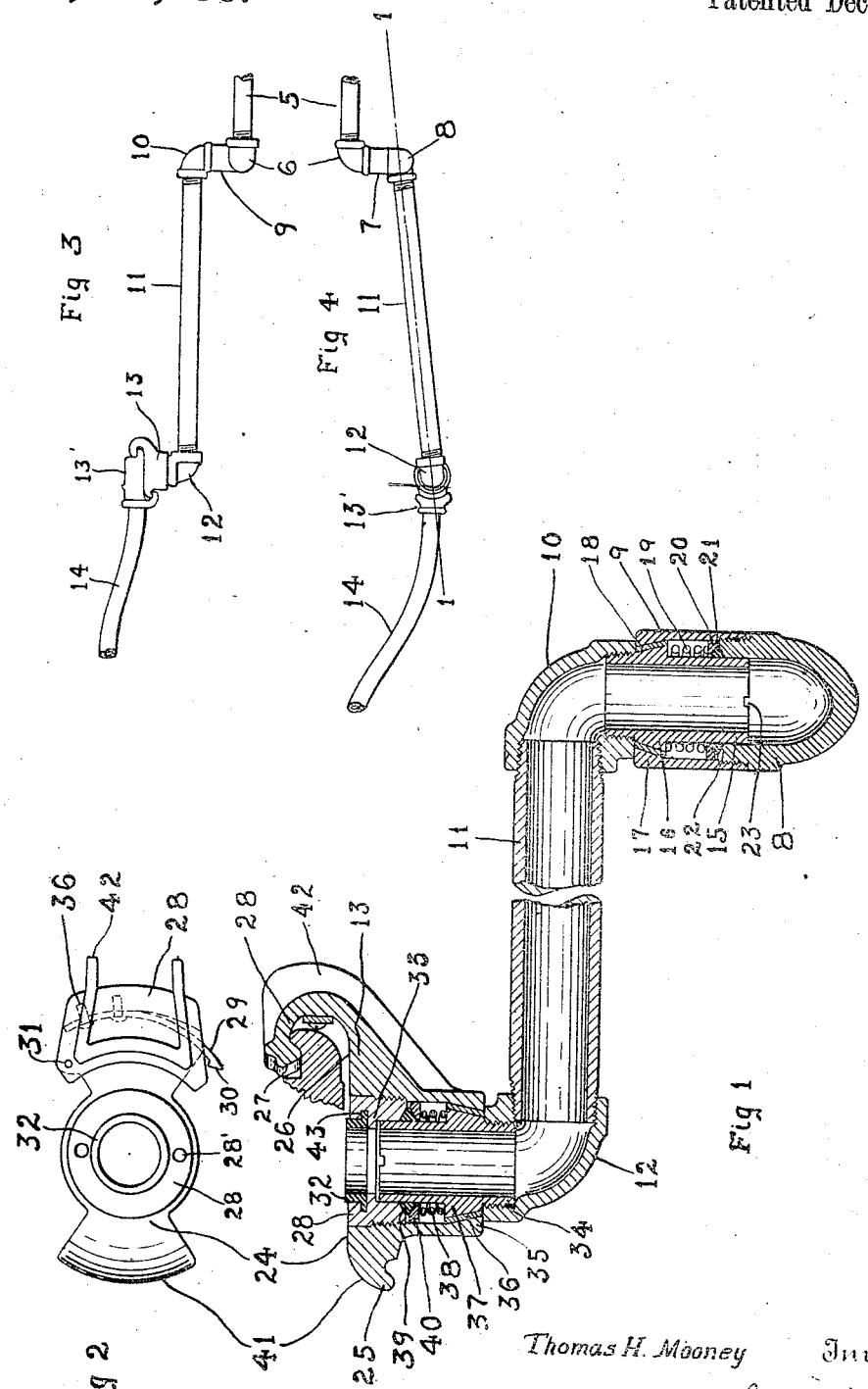
Thomas H. Mooney Inventor
By his Attorney Jesse R. Stone

UNITED STATES PATENT OFFICE.

THOMAS H. MOONEY, OF HOUSTON, TEXAS, ASSIGNOR OF ONE-HALF TO STEPHEN F. SULLIVAN, OF CHICAGO, ILLINOIS.

METALLIC TRAIN-PIPE CONNECTION.

1,250,336.  Specification of Letters Patent.  Patented Dec. 18, 1917.

Application filed May 12, 1917. Serial No. 168,086.

*To all whom it may concern:*

Be it known that I, THOMAS H. MOONEY, a citizen of the United States, residing at Houston, Harris county, Texas, have invented a certain new and useful Improvement in Metallic Train-Pipe Connections, of which the following is a full, clear, and exact description, such as will enable others skilled in the art to which it appertains to make and use the same.

My invention relates to metallic train pipes and more especially to improvements in flexible joints and couplings in use for the construction of connections between adjacent cars.

The invention contemplates the use of metallic pipes alone for the conveyance of fluid from car to car, thereby doing away with the hose of rubber or fabric composition at present used for this purpose in train connections.

One object of the present improvement is to form, in combination with the flexible metallic joint, a coupling so constructed as to form an air tight connection between cars and adapted to coöperate with the standard couplings now installed on trains.

Another object is to provide a coupling head so constructed as to present on one end a face similar in structure to the old standard coupling and adapted to coöperate with the form of coupling now in use, and providing at the other end a flexible connection on the metallic train pipe in a novel and improved manner.

Other objects of my invention will more clearly appear in the description which follows, and will be more definitely set forth in the claims appended hereto.

Reference may be had to the accompanying drawing forming a part of this specification in which similar characters of reference indicate corresponding parts in each of the figures. Figure 1 is a cross-section on the line 1—1 of Fig. 4, showing the coöperating coupling broken away; Fig. 2 is a plan view of the upper contacting face of the coupling; Fig. 3 is an upper plan view of my metallic train connection shown coupled to a hose of the old form of connection now in use; Fig. 4 is a side view at right angles to the view shown in Fig. 3.

Having particular reference to Figs. 3 and 4, I have shown the metallic train pipe 5 commonly attached to the lower part of the car (not shown). This pipe has at its outer end an elbow 6 forming a connection with the sleeve 7, which in turn forms a part of my flexible metallic joint, which joint serves to form a fluid tight connection with the elbow 8. The elbow 8 forms an attachment at its other end to another flexible joint-sleeve 9, which is in turn connected to elbow 10. Each of these flexible joints allows a rotative movement about the sleeve as an axis. This double joint forms a connection adapted to play in both vertical and lateral directions, and provides a type of universal joint. The elbow 10 is connected at its outer end to a length of pipe 11, a little longer than is necessary to bridge one-half the distance between adjacent cars. This is to allow for a sag or a downward incline of the pipe as shown in Fig. 4 for the purpose of accommodating varying play between the cars as the train stops or starts, or turns sharp curves of the track. The outer end of the pipe 11 is provided with an elbow 12 to form a connection with my novel coupling 13. This coupling is shown as coupled up with the old type of coupling 13' attached to the hose 14 of an adjacent car (not shown).

The metallic joint used by me is not here claimed to be new, having been previously covered by my Patent No. 1,160,639 issued November 16, 1915. It consists of an outer sleeve 9 (Fig. 1) which is provided at one end with a shoulder 17 inclining inwardly toward the adjacent end and threaded interiorly at the other end for attachment to the adjacent elbow 8. Within the sleeve 9 is adjusted a hollow cylindrical connecting member 15, adapted to fit closely but rotatably within the elbow 8 at one end and is exteriorly threaded at the other end to connect with the connecting elbow 10. Immediately adjacent to the threaded end of this cylinder 15 is an outwardly projecting shoulder 16 inclined inwardly toward the threaded end so as to present an annular surface adapted to coöperate with the shoulder 17 of the outer sleeve. A bushing 18 of brass or other non-friction metal is fitted between these two bearing shoulders 16 and 17 to form a non-friction bearing and one which may be readily replaced when worn.

As will be noted in Fig. 1 the outer end surface of the elbow 8 is beveled inwardly, as at 22, to provide a seat for a packing ring 21, somewhat wedge shaped in cross-section. On the other side of said ring 21 is seated a metallic washer 20 furnishing a stop for a spiral spring 19. The spring 19 surrounds the cylinder 15 and bears at its other end on the shoulder 16 of the said cylinder and serves to force the same into a close contact with the bushing 18 and maintain a tight bearing in case of wear between the parts. A wrench hold 23 is provided on one end of the sleeve 15 by means of which the opposite end may be screwed into the adjacent elbow. It is to be noted as set forth in the description of parts 7 and 9 that two of these joints are used adjacent the train end of the pipe, the two joints together making up a universal joint, allowing play in all directions.

The joint for the coupling end of the train pipe is constructed in a manner similar to that just described, but I have found it necessary in devising my new form of coupling to modify the structure materially as will be now more clearly shown.

The head of the coupling 13 which forms the outer containing sleeve of the joint has an upper face adapted to fit closely with the face of the present form of coupling. This provision is necessary in order that the cars installed with my invention may be used in connection with the present installation of the old form as well as with cars equipped with my invention. For this reason I provide my coupling with a main cylindrical body, with a flat upper face 24, having somewhat fan shaped projections, 26, and, 41, on diametrically opposite sides thereof. The member, 41, is curved downwardly at its outer periphery and provided with a downwardly projecting lug, 25, adapted to interlock with a coöperating hook member on the opposed coupling.

The opposite projection, 26, is extended upwardly and curved inwardly to form an overhanging hooked member, 28. At the inner curved end of this hook is a downwardly extending lug, 27, which is adapted to interlock with the opposed surface of the other coupling. The arm, 28, is re-inforced on its outer surface by means of longitudinally extending ridges or lugs, 42.

The interior construction of this coupling includes an inner cylindrical sleeve similar to part 15 previously described in connection with the details of the metallic joint. It is threaded at its rear end, 34, to screw into the elbow, 12, and is provided with an adjacent conical shoulder, 37, coöperating with the corresponding complementary shoulder, 35, of the coupling head and having a bushing, 36, between the two inclined wearing surfaces to provide a non-friction bearing to allow a rotative movement of the coupling head. The forward part of the said head is threaded interiorly providing a seat for a hollow cylindrical nut, 28, having two opposite wrench holes, 28'. The nut has a shoulder, 33, fitting over the upper end of the inner sleeve and the lower face is beveled on its inner margin to provide a seat for a rubber packing ring, 39, which fits between this nut and the soft metallic washer, 40. A spiral spring, 38, surrounding the inner sleeve and bearing on the shoulder, 37, and the washer, 40, serves to hold the joint tight at all times.

The forward interior of this nut is enlarged and undercut, as at 43, to furnish a seat for a rubber gasket, 32, which projects slightly beyond the flat forward surface of the coupling to furnish a tight joint when the train coupling is made.

The operation of this coupling is as follows: The two similar contacting faces of the opposed couplings are placed together, one crosswise of the other with the rubber gaskets, 32, registering together. The two parts are then rotated on the gaskets as a center, the hook, 28, of one gripping over the lug, 25, of the opposing part. The lug, 25, is pushed in under the hook, 28, until the forward edge thereof contacts with a stop pin, 31, provided at the farther edge of the hooked portion. It has been found that, with the metallic pipes used in my invention and with the rotative joint thereof, the coupling is liable to become loosened by the constant jar and vibration of the train. To guard against this I have provided a catch spring, 29, attached to the inner face of the hooked member, 28, by means of screws, 36. This catch has an outwardly projecting hook, 30. When the coöperating parts of the coupling are closed together, this catch is shoved back and when the coupling becomes closed so that the lug, 25, of one part contacts with the stop, 31, of the other, the catch will grip over the edge of the opposite lug and hold the parts from unlocking, as can be plainly seen in Fig. 2.

I have thus provided a metallic train pipe and coupling, which is simple in structure and adapted to be quickly and easily installed on trains now equipped with the present hose construction. It is durable and not subject to the rapid disintegration now experienced with the rubber pipe, and, because of its firmer structure, is easier to handle and makes a more facile joint.

What I claim is:

1. A metallic train pipe connection comprising a train pipe, a plurality of fluid tight metallic joints connected therewith at right angles to each other, an inclined pipe connected with said joints and capable of both vertical and lateral movement, an elbow on the outer end of said inclined pipe, a hollow joint pipe connected with said elbow, a coupling head rotatable on said joint pipe provided with a flat outer face, the joint pipe forming a passage issuing from the center of said face, a laterally extending lip on said face, an opposite upwardly extending hooked member and a catch to engage the opposed coupling member to retain the coupling in locked position.

2. A metallic train pipe connection comprising a metallic pipe so jointed as to allow play in vertical, lateral and longitudinal directions, an elbow on the outer end thereof, an inner tubular member threaded into said elbow and provided with a conical outwardly extending peripheral shoulder, an outer sleeve surrounding said tubular member having a coöperating inwardly extending annular bearing shoulder forming a rotatable fluid tight bearing with the inner tubular member, an enlarged upper face on said outer sleeve having laterally extending members adapted to interlock with the standard coupling, now in use.

3. A metallic train pipe connection comprising a train pipe, a flexible plurality of fluid tight metallic joints connected therewith at right angles to each other, a pipe connected with said joints and so arranged as to allow for longitudinal play between the cars of the train, an elbow on the outer end of said pipe, a joint pipe attached therein, a coupling sleeve on said joint pipe, a coupling head integral with said coupling sleeve provided with a flat outer face, a laterally extending lip thereon, an opposite upwardly extending hooked member and a leaf spring catch mounted on the inner side of said hooked member to engage the opposed coupling member to retain the coupling in locked position.

4. A metallic train pipe connection comprising a metallic pipe so jointed as to allow play in vertical, lateral and longitudinal directions, a coupling on the outer end thereof formed with a hollow cylindrical sleeve portion rotatably mounted on a central joint pipe in such a manner as to provide a fluid tight joint, a flat coupling face on the outer surface of said sleeve portion adapted to engage the coupler now in use.

5. A coupling for metallic train pipes comprising an inner tubular member, threaded at one end, a conical bearing portion adjacent to the threaded portion and provided with a shoulder thereon, an outer cylindrical head having an inner conical bearing surface coöperating with the bearing of the tubular member, a tubular nut adapted to be screwed into the upper portion of the head and forming a shoulder around the inner tubular member, a spiral spring surrounding the tubular member and bearing on the shoulder of the nut and also on that of the inner tubular member, an enlarged outer face on the head provided with a downwardly curved lip on one side and an oppositely arranged upwardly curved hook member to coöperate with the coupling now in use, and a catch on the inner face of said hook member to hold the coupling in engaged position.

6. A coupling head for metallic train pipe connections comprising an outer tubular head member, a flat outer contacting face thereon, a downwardly curved fan shaped lip on one margin of said face, an oppositely disposed upwardly extending hooked portion, a spring catch on the inner face of the hooked portion, serving to engage an opposed coupling, a second tubular member within the outer head member having a threaded connection with the train pipe and forming with the outer head member a rotatable fluid-tight joint.

7. A metallic train pipe connection comprising a main pipe, a plurality of rotatable fluid-tight metallic joints connecting the same to an inclined metallic connecting pipe in such manner as to allow movement of said pipe in all directions, a single elbow on the outer end of said connecting pipe, a joint pipe attached thereto, an outer coupling head rotatable on said joint pipe and forming a part of the joint said head provided with a coupling face adapted to coöperate with the standard form of coupling now in use.

8. In a metallic train pipe connection, a train pipe, a coupling pipe connected by a universal joint thereto, an elbow on the outer end of said coupling pipe, a cylindrical joint member attached thereto, a shoulder on the inner end of said joint member, a coupling head fitting over and rotatable on said joint member, a shoulder on said sleeve contacting with said joint member, means to hold said shoulders in close relation to form a fluid-tight joint, a lip on one side of said head, a hook on the opposite side, and a spring within said hook to lock the coupling automatically in closed position.

In testimony whereof, I hereunto affix my signature this the 8th day of May, A. D. 1917.

THOMAS H. MOONEY.

Copies of this patent may be obtained for five cents each, by addressing the "Commissioner of Patents, Washington, D. C."